United States Patent
Baptiste et al.

(10) Patent No.: US 8,031,499 B2
(45) Date of Patent: Oct. 4, 2011

(54) DIRECT CURRENT/DIRECT CURRENT CONVERTER WITH MULTIPLE OUTPUTS

(75) Inventors: Thierry Baptiste, Lannion (FR); Sebastien Duprez, Plouaret (FR)

(73) Assignee: 3W Power Holdings B.V., Zwananburg (NL)

( * ) Notice: Subject to any disclaimer, the term of this patent is extended or adjusted under 35 U.S.C. 154(b) by 495 days.

(21) Appl. No.: 12/303,337

(22) PCT Filed: Jun. 8, 2007

(86) PCT No.: PCT/FR2007/051395
§ 371 (c)(1),
(2), (4) Date: Dec. 3, 2008

(87) PCT Pub. No.: WO2008/006992
PCT Pub. Date: Jan. 17, 2008

(65) Prior Publication Data
US 2009/0257248 A1    Oct. 15, 2009

(30) Foreign Application Priority Data
Jun. 14, 2006 (FR) .................. 06 52127

(51) Int. Cl.
*H02M 7/217* (2006.01)
(52) U.S. Cl. .................. 363/127; 363/21.06; 363/89
(58) Field of Classification Search .............. 363/16–20, 363/21.06, 21.07, 21.11, 89, 91, 97; 323/282, 323/284, 288, 267, 313, 239, 271
See application file for complete search history.

(56) References Cited

U.S. PATENT DOCUMENTS

| | | | |
|---|---|---|---|
| 5,144,547 A * | 9/1992 | Masamoto | 363/127 |
| 5,841,313 A | 11/1998 | Levin et al. | |
| 5,986,911 A | 11/1999 | Tang | |
| 6,069,802 A * | 5/2000 | Priegnitz | 363/21.06 |
| 6,128,203 A * | 10/2000 | Canizales Teran | 363/21.06 |
| 6,246,592 B1 * | 6/2001 | Balogh et al. | 363/16 |
| 6,275,401 B1 * | 8/2001 | Xia | 363/127 |
| 6,297,970 B2 * | 10/2001 | Hemena et al. | 363/21.06 |
| 6,490,178 B1 | 12/2002 | Asayama | |
| 2001/0030879 A1 | 10/2001 | Greenfeld et al. | |
| 2003/0147265 A1 | 8/2003 | Thereze et al. | |

FOREIGN PATENT DOCUMENTS

| EP | 0 939 483 A2 | 9/1999 |
| EP | 1 148 627 A2 | 10/2001 |
| EP | 1 335 483 A1 | 8/2003 |

* cited by examiner

*Primary Examiner* — Rajnikant Patel
(74) *Attorney, Agent, or Firm* — Sughrue Mion, PLLC

(57) ABSTRACT

In a DC/DC converter comprising a transformer (10) having a primary winding Np and at least first and second secondary windings Ns1 and Ns2; a main output path connecting the first secondary winding to a main output Vp and comprising a synchronous rectifier circuit, a first inductor L1, and a first capacitor C1; and an input path connecting a DC supply voltage Ve to the primary winding and including a switch circuit (12) controlled by a first pulse width modulator PWM1 to regulate the main output voltage by switching the current in the primary winding, there is provided an auxiliary output circuit connecting the second secondary winding to an auxiliary output Va and comprising an auxiliary rectifier path having a control switch M5, a free-wheel switch M6, a rectifier switch M3, a second inductor L2, and a second capacitor C2; and a second pulse width modulator PWM2 connected to the control switch M5 and to the free-wheel switch M6 to control a conduction interval of said switches in order to regulate the auxiliary output independently of the main output, the rectifier switch M3 being controlled synchronously with the synchronous rectifier circuit of the main path.

6 Claims, 4 Drawing Sheets

DIRECT CURRENT/DIRECT CURRENT CONVERTER WITH MULTIPLE OUTPUTS

FIELD OF THE INVENTION

The present invention relates to the field of DC/DC converters, and it relates more particularly to a converter capable of delivering a plurality of output voltages.

PRIOR ART

The use of DC/DC converters is well known in all types of industry. Many such converters that include a transformer to provide isolation deliver a single output voltage that, depending on their configuration, is either greater (a boost converter) or smaller (a buck converter) than the DC voltage delivered to the primary of the transformer. Nevertheless, converters are known that deliver a plurality of output voltages. Thus, U.S. Pat. No. 5,541,828 describes a converter in which the secondary of the transformer has a plurality of windings so as to deliver positive voltages on auxiliary outputs in addition to the positive voltage delivered by the main output of the converter. Nevertheless those auxiliary secondary voltages are constant and simply defined by the transformation ratios between the primary winding and the secondary windings of the transformer.

OBJECT AND DEFINITION OF THE INVENTION

The present invention thus provides a DC/DC converter that enables this proportionality to be overcome and that also makes it possible to regulate multiple output voltages that are delivered in addition to the main output voltage.

These objects are achieved by a DC/DC converter comprising:
- a transformer having a primary winding Np and at least first and second secondary windings Ns1 and Ns2;
- a main output path connecting the first secondary winding to a main output Vp and comprising a synchronous rectifier circuit, a first inductor L1, and a first capacitor C1;
- an input path connecting a DC supply voltage Ve to the primary winding and including a switch circuit controlled by a first pulse width modulator PWM1 to regulate the main output voltage by switching the current in the primary winding;
- an auxiliary output path connecting the second secondary winding to an auxiliary output Va and comprising an auxiliary rectifier circuit having a control switch M5, a free-wheel switch M6, a rectifier switch M3, a second inductor L2, and a second capacitor C2;
- a second pulse width modulator PWM2 connected to the control switch M5 and to the free-wheel switch M6 to control a conduction interval of said switches in order to regulate the auxiliary output independently of the main output, the rectifier switch M3 being controlled synchronously with the synchronous rectifier circuit of the main path.

Thus, with this specific configuration incorporating a synchronous rectifier delayed by an auxiliary path controlled by the control signals of the main path, it is possible to obtain any output voltage whether greater than or less than the input voltage. This simplicity also makes it possible to achieve a considerable reduction in the weight and the volume of the connect, thus making it easier to use in aviation applications.

Advantageously, said first pulse width modulator controlling said switch circuit is connected either to the primary of the transformer, or else to the secondary of the transformer and is then isolated from the switch circuit by an isolator circuit.

Depending on the intended embodiment, said synchronous rectifier is self-timed and includes a control switch M1 having its grid connected to a first end of a first secondary winding and a free-wheel switch M2 having its grid connected to a second end of the first secondary winding, or else, its timing control is simple and it may then comprise two switches M1 and M2 connected in series respectively with a first winding portion Ns1$a$ and with a second winding portion Ns1$b$ of the first secondary winding, these first and second winding portions having one end in common, the grids of each of the two switches being controlled from said first pulse width modulator PWM1, and said second secondary winding is constituted by a first winding portion Ns2$a$ and a second winding portion Ns2$b$ having one end in common, the other two ends of these two winding portions of the second secondary winding being connected to two rectifier switches M3 and M4 that are controlled in parallel and synchronously with the first synchronous rectifier circuit.

Said switches are preferably metal oxide on silicon field effect transistors (MOSFETs).

BRIEF DESCRIPTION OF THE DRAWINGS

The characteristics and advantages of the present invention appear more clearly from the following description made by way of non-limiting indication and with reference to the accompanying drawings, in which.

DETAILED DESCRIPTION OF A PREFERRED EMBODIMENT

Figure 1:
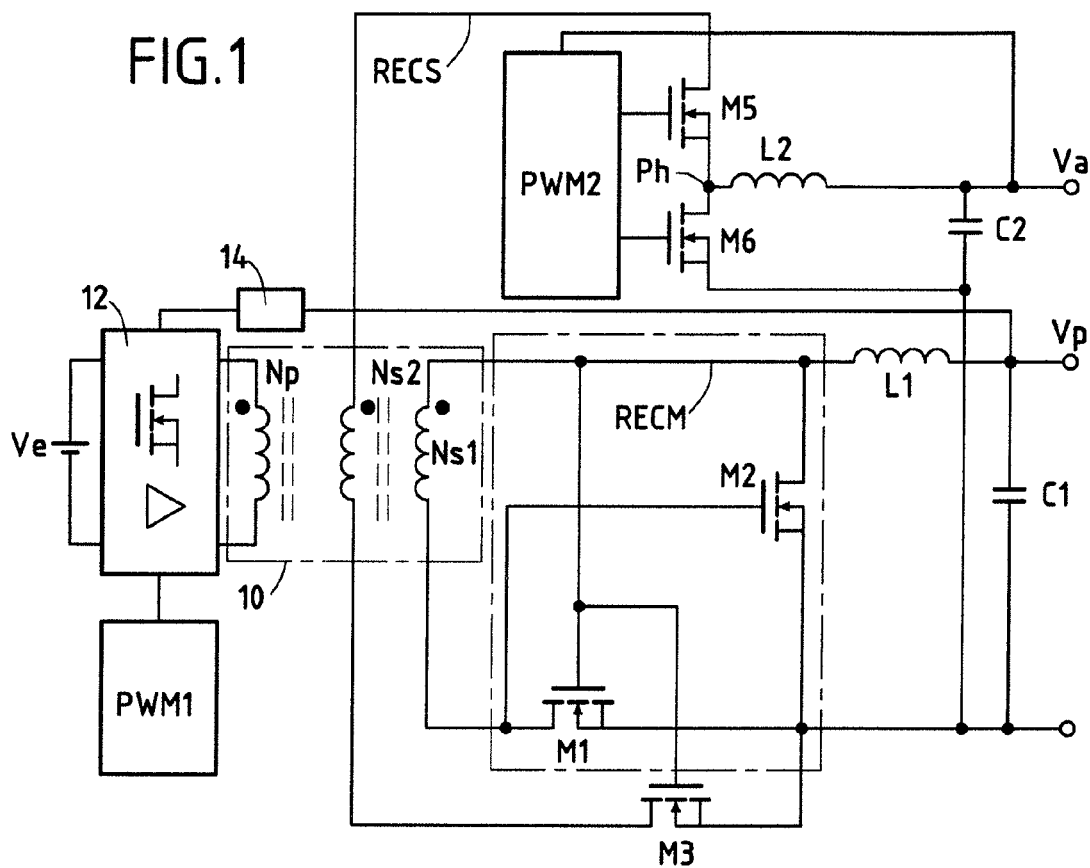
FIG. 1 shows a first embodiment of a DC/DC converter having multiple output voltages in accordance with the present invention.

FIG. 1 shows a first embodiment of a multiple output voltage DC/DC converter of the invention.

In known manner, the converter comprises a transformer 10 having a primary winding Np fed in conventional manner from a DC voltage Ve via a switching circuit 12 controlled by a first pulse width modulator (PWM1) operating in a closed loop to regulate the main output voltage Vp from the converter as received via an isolator circuit 14. This main voltage is available at the terminals of a first capacitor C1 having one end connected to one end of a first secondary winding Ns1 of the transformer via a first inductor L1 and having its other end forming the ground terminal and connected to the other end of the first secondary winding via a control switch M1. A free-wheel switch M2 is connected between the other end of the capacitor C1 and the end of the secondary winding. These two switches are preferably MOSFET transistors and they are connected as a self-timed synchronous rectifier with the grid of the switch M1 connected to the end of the secondary winding and the grid of the switch M2 connected to the other end of the secondary winding.

Figure 1A:
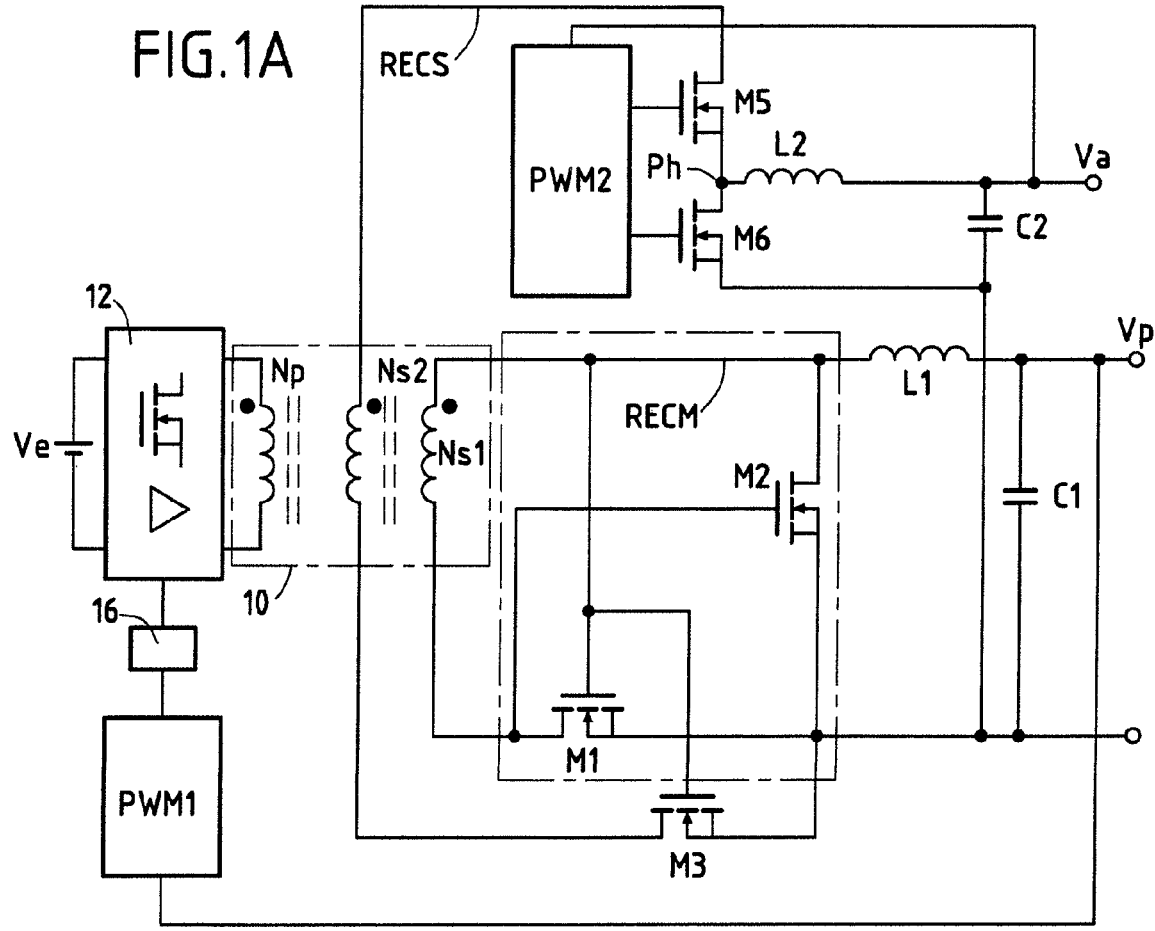
FIG. 1A shows a variant of FIG. 1 in which the circuit for switching a primary is controlled from the secondary.

In the variant of FIG. 1A, the switching circuit 12 is controlled by the first pulse width modulator (PWM1) that is now connected to the secondary of the transformer 10 and from which it is isolated by a conventional isolator circuit 16.

In the invention, the converter also delivers an auxiliary output voltage Va across the terminals of a second capacitor C2 having one end connected to the other end of the capacitor C1 forming the ground terminal and having its other end connected to one end of a second inductor L2 whose other end is connected to one end of a second secondary winding Ns2 via a control switch M5. The other end of the second secondary winding is connected to the ground terminal via a rectifier switch M3, and a free-wheel switch M6 is connected between said ground terminal and the second end of the inductor L2. The switches M3, M5, and M6 are preferably MOSFET transistors, the grid of the switch M3 being connected to the grid of the switch M1 so that these two switches are controlled in parallel completely synchronously, and the grids of the switches M5 and M6 are controlled by a second pulse width modulator PWM2 (post-synchronous regulation) that performs closed-loop regulation of the auxiliary output voltage Va by delayed synchronous rectification. The self-synchronous control of M3 is not obtained from the path that it rectifies, but from the main path. Thus, the fact that the control of M3 is connected to the signal RECM and not to the signal RECS (as in a conventional synchronous structure making use of the winding to which M3 is connected) makes it simple to off-load the control of the self-timed synchronous rectifier. The point carrying the signal RECM is connected solely to inductors and not to the stray capacitances of the rectifiers M5 and M6, which would have had the effect of rendering the synchronous rectification non-operational, since they are connected in parallel on the control of M3.

The operation of the FIG. 1 converter is described below with reference to the timing diagram of FIG. 2 in which the signal RECM is the signal on the grid of the switch M1 and is also the output signal of the main path prior to filtering, the signal RECS is the signal at one end of the second secondary winding Ns2, the signal Ph is the auxiliary output signal prior to filtering, M2 is the signal on the grid of the switch M2, and M5 and M6 are the signals controlling the grids of the switches M5 and M6, respectively.

It should firstly be observed that the main output voltage Vp is regulated in conventional manner by the first modulator PWM1 regardless of whether it is connected to the primary (FIG. 1) or to the secondary (FIG. 1A) of the transformer, which modulator delivers a duty ratio that is adjusted to maintain the main output voltage at the desired level.

Figure 2:
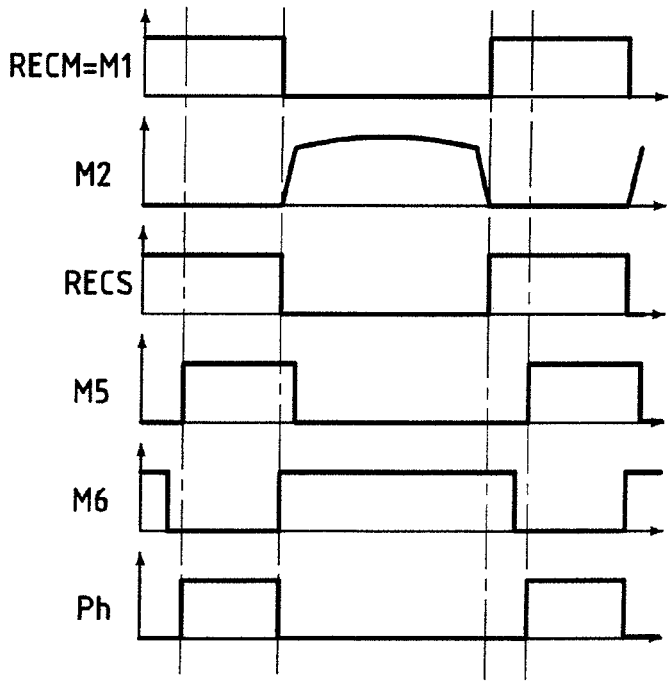
FIG. 2 is a timing chart showing the various signals available in the FIG. 1 converter.

The auxiliary voltage Va is regulated by the second modulator PWM2 that controls the switches M5 and M6 in accordance with the timing charts of FIG. 2. The voltage RECS delivered upstream from the switch M5 is greater than the auxiliary voltage Va, being proportional to the voltage RECM delivered upstream from the cell L1C1 filtering the main output voltage and depending on the transformation ratio between Ns1 and Ns2 in application of the formula:

$$RECS=[Ns1/Ns2]*RECM$$

During the stage of transferring the energy of the main voltage, the switch M3 is controlled like the switch M1 and the switch M5 is controlled by the second modulator PWM2. In contrast, during the free-wheel stage of the same main voltage, the switch M3 is off as is likewise the switch M1 so that no cross-conduction can appear as a result of the internal diodes of M5 and M6. Since M3 is self-timed by the winding Ns2, the stray capacitance of M5 and M6 maintains M3 in conduction during transformer voltage reversal (at the end of the stage of transferring energy from the primary to the secondary). The energy accumulated in the secondary is then reinjected directly (and without limit) to the primary. In addition, by performing single-wave rectification, M3 enables M5 to be a one-way only switch, thereby making the converter easier to design.

Figure 3:
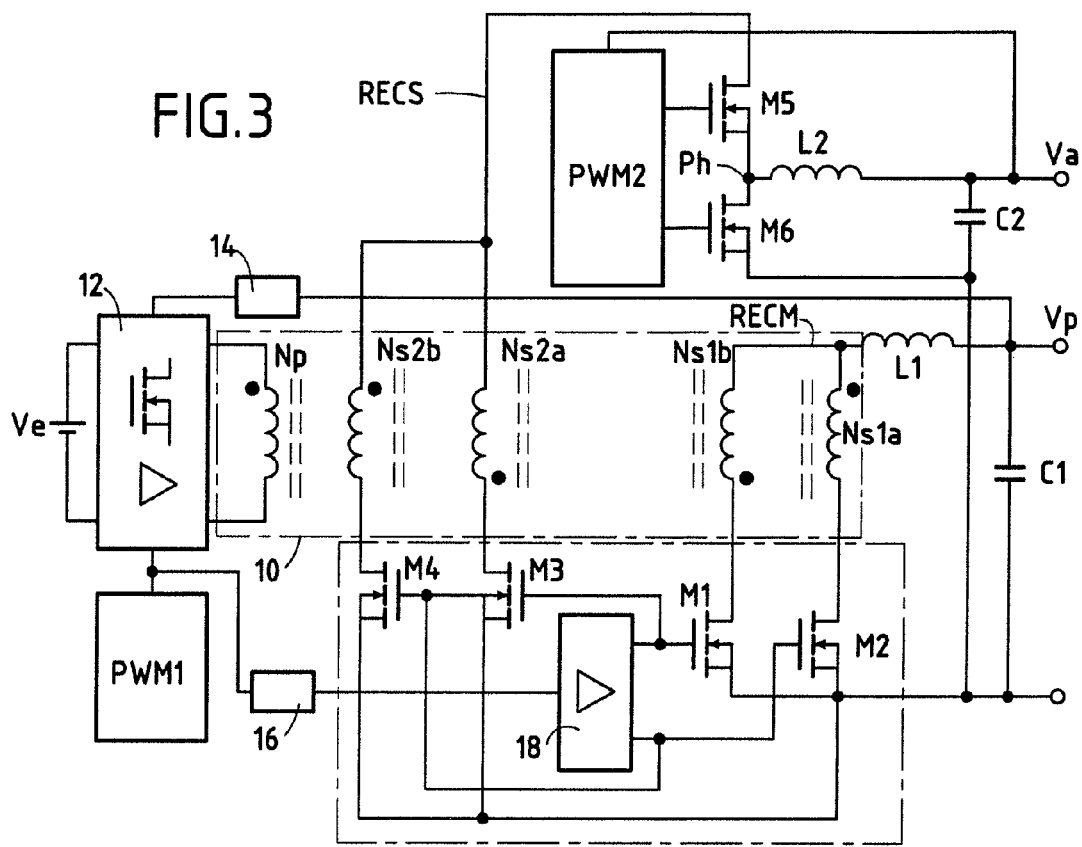
FIG. 3 shows a second embodiment of a DC/DC converter with multiple output voltages in accordance with the present invention.
Figure 3A:
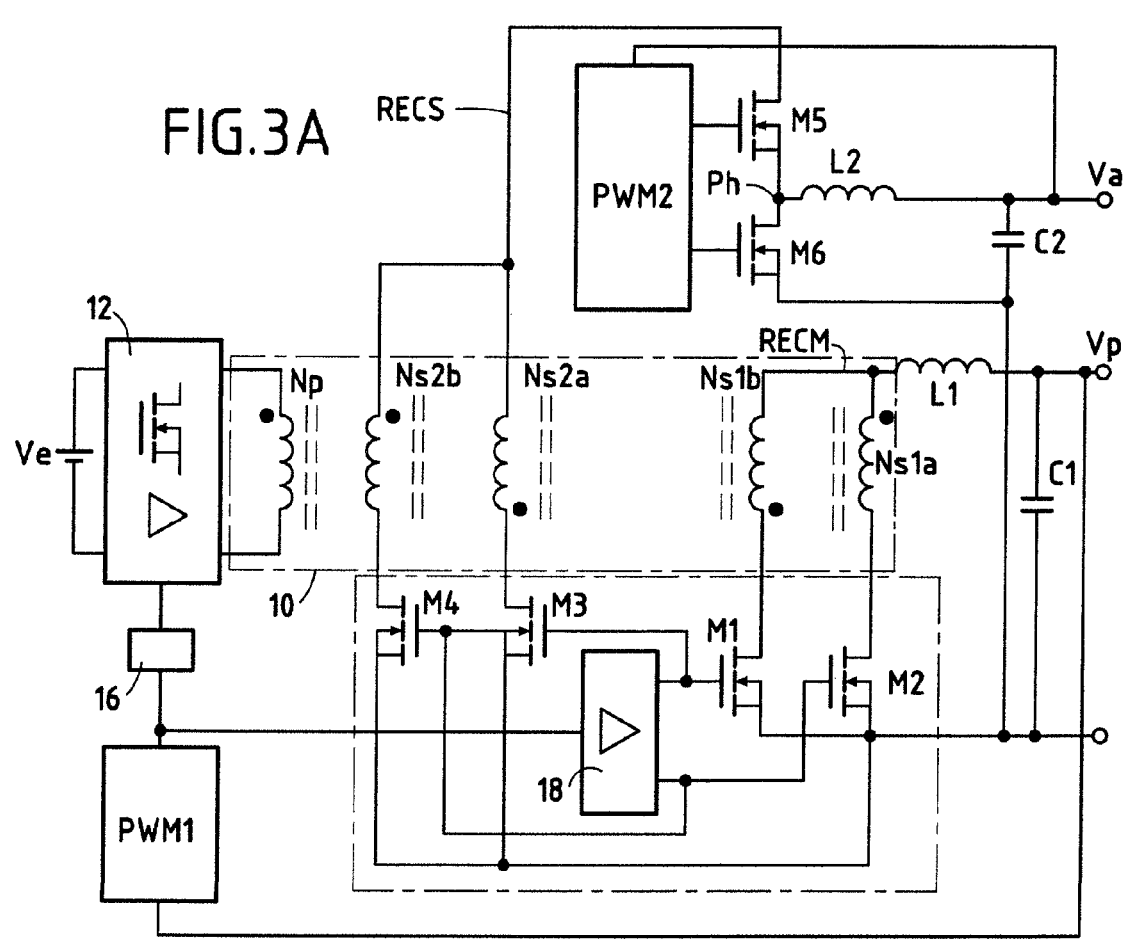
FIG. 3A shows a variant of FIG. 3 in which the switching circuit of the primary is controlled from the secondary.

A second embodiment of a multiple output voltage DC/DC converter of the invention is shown in FIG. 3. A variant of this embodiment is shown in FIG. 3A.

In this embodiment, the main output voltage Vp is no longer regulated by a self-timed synchronous rectifier, but is regulated by a simple controlled synchronous rectifier, the first pulse width modulator (PWM1) for providing closed-loop regulation of the main output voltage Vp of the converter being capable of controlling both the switching circuit 12 and the circuit 18 for controlling the switches M1 and M2 from the primary (FIG. 3) or from the secondary (FIG. 3A) of the transformer 10 via the isolator circuit 16. As before, and as is known, the main voltage is available from the terminals of a first capacitor C1 having one end connected to one end of a first portion Ns1a of a first secondary winding of the transformer via a first inductor L1 and having its other end forming a ground terminal that is connected to the other end of said first portion of the first secondary winding via the control switch M1. However, in this embodiment, the free-wheel switch M2 is connected in series between the ground terminal and one end of a second portion Ns1b of the first secondary winding that has its other end connected to the end of the first portion Ns1a of the first secondary winding that is connected to the inductor L1. Both switches are preferably MOSFET transistors having their grids controlled by the first modulator PWM1, as described above.

According to the invention, the converter also delivers an auxiliary output voltage Va across the terminals of the second capacitor C2 that has one end connected to the other end of the capacitor C1 constituting the ground terminal and has its other end connected to one end of the second inductor L2 whose own other end is connected to one end of a first portion Ns2a of the second secondary winding via the control switch M5. As in the above-described embodiment, the other end of this second portion of the second secondary winding is connected to the ground terminal via the rectifier switch M3, and a free-wheel switch M6 is connected between said ground terminal and the second end of the inductor L2. In this embodiment, another rectifier switch M4 is also provided that is connected in series between the ground terminal and one end of a second portion Ns2b of the second secondary winding, the other end thereof being connected to the end of the first portion Ns2a of said second secondary winding that is connected to the control switch M5.

The switches M3, M4, M5, and M6 are preferably MOSFET transistors, the grid of the switch M3 being connected to the grid of the switch M1, the grid of the switch M4 being connected to the grid of the switch M2, and the grids of the switches M5 and M6 being controlled by the second modulator PWM2, which acts as in the above-described embodiment to regulate the auxiliary output voltage Va.

Figure 4:
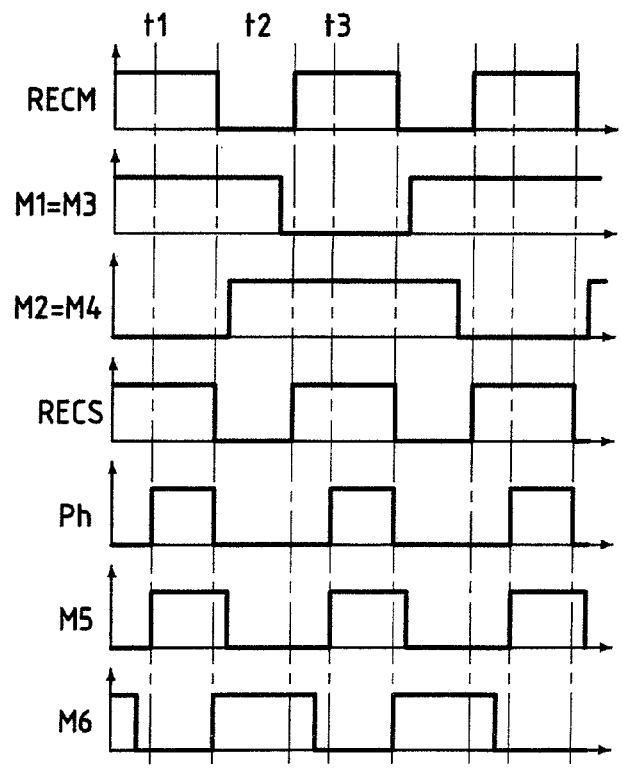
FIG. 4 is a timing diagram showing the various signals available in the FIG. 3 converter.

The operation of the FIG. 3 converter can be deduced from the timing diagram of FIG. 4 which reproduces the signals described above with reference to FIG. 2.

During the period t1, the voltage RECM is positive, the switch M1 is on, and the switch M3 is also controlled by the same signal. The switches M2 and M4 are off. During t2, RECM is equal to zero, the switch M2 is on and the switch M4 is also controlled by the same signal. During t3, RECM is negative, the switches M2 and M4 are on and the switches M1 and M3 are off. As in the above-described embodiment, the switches M5 and M6 are controlled by the second modulator PWM2 and the voltage RECS delivered upstream from the switch M5 is, as in the above-described embodiment, also proportional to the voltage RECM delivered upstream from the cell L1C1 filtering the main output voltage and depends on the transformation ratio between Ns1 and Ns2 in application of the same formula:

$$RECS=[Ns1/Ns2]*RECM$$

Thus, with the present invention, it is possible to deliver any output voltage at a higher or lower level than the voltage of the primary, depending on the number of turns of the secondary of the transformer and the setpoint voltage for the post-synchronization regulation loop.

The invention claimed is:

1. A DC/DC converter comprising:
a transformer (10) having a primary winding Np and at least first and second secondary windings Ns1 and Ns2;
a main output path connecting the first secondary winding to a main output Vp and comprising a synchronous rectifier circuit, a first inductor L1, and a first capacitor C1;
an input path connecting a DC supply voltage Ve to the primary winding and including a switch circuit (12) controlled by a first pulse width modulator PWM1 to regulate the main output voltage by switching the current in the primary winding;
an auxiliary output path connecting the second secondary winding to an auxiliary output Va and comprising an auxiliary rectifier circuit having a control switch M5, a free-wheel switch M6, a rectifier switch M3, a second inductor L2, and a second capacitor C2;
a second pulse width modulator PWM2 connected to the control switch M5 and to the free-wheel switch M6 to control a conduction interval of said switches in order to regulate the auxiliary output independently of the main output, the rectifier switch M3 being controlled synchronously with the synchronous rectifier circuit of the main path.

2. A DC/DC converter according to claim 1, characterized in that said first pulse width modulator (PWM1) controlling said switch circuit is connected to the primary of the transformer.

3. A DC/DC converter according to claim 1, characterized in that said first pulse width modulator (PWM1) controlling said switched circuit is connected to the secondary of the transformer and is isolated from the switch circuit by an isolator circuit (16).

4. A DC/DC converter according to claim 1, characterized in that said synchronous rectifier is self-timed and includes a control switch M1 having its grid connected to a first end of a first secondary winding and a free-wheel switch M2 having its grid connected to a second end of the first secondary winding.

5. A DC/DC converter according to claim 1, characterized in that said synchronous rectifier circuit has two switches M1 and M2 connected in series respectively with a first winding portion Ns1a and with a second winding portion Ns1b of the first secondary winding, these first and second winding portions having one end in common, the grids of each of the two switches being controlled from said first pulse width modulator PWM1, and in that said second secondary winding is constituted by a first winding portion Ns2a and a second winding portion Ns2b having one end in common, the other two ends of these two winding portions of the second secondary winding being connected to two rectifier switches M3 and M4 that are controlled in parallel and synchronously with the first synchronous rectifier circuit.

6. A DC/DC converter according to claim 1, characterized in that switches (M1 to M6) are MOSFET transistors.

* * * * *